United States Patent Office 3,438,922
Patented Apr. 15, 1969

3,438,922
ADHESIVE COMPOSITION
Kenzo Ueno and Yukio Sato, Osaka, Japan, assignors to Takeda Chemical Industries, Ltd., Osaka, Japan
No Drawing. Continuation of application Ser. No. 356,084, Mar. 31, 1964. This application Aug. 18, 1967, Ser. No. 661,722
Claims priority, application Japan, Apr. 2, 1963, 38/16,858; July 15, 1963, 38/38,520
Int. Cl. C08 37/14, 37/08
U.S. Cl. 260—29.3       2 Claims

ABSTRACT OF THE DISCLOSURE

An adhesive composition is provided herein which is an aqueous dispersion of the reaction product of (1) an isocyanate blocking agent which may be a phenol, an active methylene compound or an oxime, and (2) a polymeric modified triisocyanate being produced by the reaction of an aromatic di-isocyanate with a trifunctional polyester polymer having a molecular weight of about 1000–4000, the isocyanate groups of the said reaction product being completely blocked.

---

This application is a continuation of application Ser. No. 356,084 filed Mar. 31, 1964, now abandoned.

This invention relates to a composition used as an adhesive agent which is particularly suitable as an adhesive agent for adhering polyester fiber to rubber. A variety of methods for adhering synthetic fibers such as rayon, vinylon or nylon, or regenerated fibers to rubbers have been proposed, but none of them have been satisfactory.

Particularly, as a method for adhering polyester fiber having few functional groups in its structure (for example, polyethylene terephthalic fibrous materials) to rubbers, there has been found no suitable one. For such a purpose, an adhesive agent (referred to as RFL) consisting of butadiene-styrene-vinylpyridine copolymer latex (referred to as VP latex) and resorcin-formaldehyde resins has been employed.

It is, however, poor in adhesive force, and this is a big drawback in using the above-mentioned fibrous materials as the reinforcing material in reinforced rubber articles.

For remedying the drawback, another method has also been proposed, which comprises adhering polyester fibrous materials to rubbers by the use of isocyanate compounds. This method, however, requires use of a large amount of organic solvents which are dangerous and expensive. To make the matter worse, these isocyanate compounds are unstable, viz, they are to gel during storage or even in the course of preparation or application, so that they often are not able to withstand severe service. Such disadvantages are found more often when they are used together with rubber-cement, and therefore, such methods as mentioned above have not been advantageously employed in an industrial scale.

With the purpose of eliminating the drawbacks found in the adhesive agent containing isocyanate compounds, another adhesive agent, in which blocked isocyanate is employed, has recently been proposed. This agent does not have the drawbacks as found in the above mentioned adhesive agent in which isocyanate compounds are employed, but fibrous materials receiving heat-treatment with this agent turn out to be very rigid losing flexibility. So, a product prepared by adhesion of fibrous materials to rubbers is poor in its flexibility, i.e., poor in its dynamic adhesion, and the fibrous materials will separate from the rubber when the product is used for a relatively long time, which is, of course, a fatal defect. Therefore, to application of the product prepared by such a process to an industrial field where large flexibility is required, e.g., in tires for automobiles, i.e. a strong dynamic adhesion, is almost impossible.

In view of the afore-mentioned circumstances, the present inventors have made many attempts to find a composition usable as an excellent adhesive agent for adhering fibrous materials, particularly polyester fibrous materials, to rubbers, which is very stable, has strong static and dynamic adhesion and does not require any organic solvent for the preparation thereof.

The present invention relates to a composition usable as an adhesive agent suitable for adhering fibrous materials, more specifically, polyester fibrous materials to rubbers, which consists of (A) an aqueous dispersion containing a product obtained by the reaction of an isocyanate blocking agent with a high molecular modified tri-isocyanate compound, the latter compound being obtained by allowing aromatic di-isocyanate to react with a polymer, the ratio of the total number of NCO groups of the aromatic di-isocyanate and the total number of active hydrogens in said polymer being not less than 2, said polymer being tri-functional polyester, its molecular weight being about 1000–4000, which is obtained by condensation of dicarboxylic acid or its anhydride, glycol and low molecular triol, or (B) an aqueous dispersion containing a product obtained by the reaction of an isocyanate blocking agent with a high molecular modified poly-isocyanate compound, the latter compound being obtained by allowing aromatic poly-isocyanate having not less than three isocyanate groups in its molecule to react with a polymer, the ratio of the total number of NCO groups and the total number of active hydrogens in said polymer being not less than $n$ ($n$=number of NCO groups contained in a molecule of poly-isocyanate), said polymer being a di-functional polyester, its molecular weight being about 1000–4000, obtained by condensation of dicarboxylic acid or its anhydride with glycol.

As an embodiment of the composition of this invention, there is included an aqueous dispersion containing a product resulting from the reaction of high molecular modified polyisocyanate and an isocyanate blocking agent, said high molecular modified polyisocyanate being obtained by allowing aromatic di-isocyanate to react with tri-functional polyester. As the aromatic di-isocyanate, there are included, for example, tolylene di-isocyanate (TDI), diphenyl methane di-isocyanate (MDI), dianisidine di-isocyanate, bi-phenylene di-isocyanate, bi-tolylene di-isocyanate, naphthylene di-isocyanate or phenylene di-isocyanate, and among these, TDI and MDI are especially preferable. TDI may be employed as either its 2,4-isomer or 2,6-isomer or as a mixture thereof.

The tri-functional polyester may be prepared by subjecting to condensation reaction one or more of low molecular triols such as trimethylol propane, glycerine, hexane triol or trimethylol ethane, one or more glycols such as ethylene glycol, propylene glycol, butylene glycol, diethylene glycol, dipropylene glycol or triethylene glycol and one or more dicarboxylic acids such as adapic acid, maleic acid, phthalic acid, iso-phthalic acid, terephthalic acid, glutaric acid, pimelic acid, sebacic acid, iso-sebacic acid, succinic acid, itaconic acid or dimeric acid or their acid anhydrides.

The condensation reaction may be carried out by method known per se, e.g., the method described in "Polyesters and Their Application," third printing, April, 1959, published by Bjorksten Research Lab. Inc., New York, U.S.A., namely, by heating the reactants, while removing water, in the presence of an esterification catalyst such as mineral acid or ion-exchange resins. The thus obtained tri-functional polyester has three terminal functional groups in the molecule which are all hydroxyl groups or carboxyl groups or both, and in this invention polyesters having any of such three terminal functional groups may be employed.

As such tri-functional polyesters as mentioned above, those are especially preferable which are obtained by reacting one or more dicarboxylic-acids selected from the group consisting of adipic acid, phthalic acid, maleic acid, itaconic acid, or their acid anhydrides and one or more glycols selected from the group consisting of ethylene glycol, propylene glycol and one or more triols selected from the group consisting of trimethylol propane, glycerine and hexane triol. The polyether triol may be obtained by polymerization of alkylene oxide such as ethylene oxide, propylene oxide, butylene oxide or styrene oxide, using a low molecular triol such as trimethylol propane, glycerine and hexane triol as an initiator, by such a known method as described in "High Polymer, Vol. XIII, Polyethers, Part I" (1963), by Norman G. Gaylord, published by Interscience Publishers, under acidic or alkaline conditions. The thus obtained polyether triol has three terminal hydroxyl groups in the molecule. Among polyether triols as mentioned above, those are preferable which are prepared by polymerization of ethylene oxide or propylene oxide using, as an initiator, trimethylol propane, glycerine, hexane triol, etc.

The afore-explained tri-functional polyester provides when its molecular weight is too small, a weak adhesive force to an adhesive agent which is prepared by the use of such polyester, while, when their molecular weight is too large, a low dynamic adhesion. Otherwise stated, fibrous materials treated with an adhesive agent prepared by the use of such polyester having too large molecular weight are apt to lose their flexibility. Usually, such tri-functional polyester having a molecular weight ranging from 1000 to 4000 is employed, and especially those having 1000–2000 molecular weight are preferable.

The aromatic di-isocyanate is allowed to react with the tri-functional polyester at such a rate that the total number of NCO groups in said di-isocyanate relative to the total number of active hydrogens in said tri-functional polyester are two times or more. This reaction readily proceeds in the presence or absence of a solvent having no active hydrogen, for example, ketones such as acetone or methyl ethyl ketone, esters such as ethyl acetate or butyl acetate, or aromatic hydrocarbons such as benzene, toluene or xylene, at a room temperature or by heating to about 40° C. to about 120° C. In this case, there may be used a catalyst such as tin compounds, and amine compounds. As the tin compounds, there are included, for example, tin hexanoate, tri-n-butyltin acetonate, bis(2-ethylhexyl) tin oxide, di-n-butyltin acetate, di-n-butyltin-dilaurate, and di-n-butyltin di(2-ethylhexanoate). As the amine compounds, there are included, for example, tetra(hydroxyethyl)ethylenediamine, tetra(hydroxypropyl)ethylenediamine, triethylenediamine, trimethylpiperazine, trimethylamine and triethylamine.

Thus, high molecular modified tri-isocyanate compounds having three terminal NCO groups are obtained as the result of an addition reaction occurred between terminal functional groups of tri-functional polyester and NCO groups of aromatic di-isocyanates. The high molecular modified tri-isocyanate is then allowed to react with an isocyanate blocking agent. In this case, the high molecular modified tri-isocyanate may be allowed to directly react with an isocyanate blocking agent without taking the former from the reaction mixture in which it is formed.

As an isocyanate blocking agent, there may be mentioned, for example, phenols, tertiary alcohols, active methylene compounds, aromatic secondary amines, mercaptanes, lactams or oximes, and, among them, phenols such as phenol or cresol, tertiary alcohols such as t-amyl alcohol, active methylene compounds such as acetoacetic acid ester or malonic acid di-ester and oximes such as methyl ethyl ketone oxime or cyclohexanone oxime.

Reaction between high molecular modified tri-isocyanate compounds and an isocyanate blocking agent readily proceeds at room temperature or by heating to about 40–120° C., using the latter in approximately equi-mole, or in slight excess, based on the NCO group in the former in the presence or absence of a solvent having no active hydrogen, as ketones, esters or aromatic hydrocarbons.

In this case, there may be used a catalyst such as the afore-mentioned tin compounds and amine compounds.

Thus, as the result of the addition reaction which occurred between the blocking agent and the three terminal NCO groups in the high molecular modified tri-isocyanate, high molecular compound having blocked isocyanate groups, namely, high molecular modified blocked tri-isocyanate, is obtained.

By dispersing, into water, the so produced compound with or without the aid of a suitable emulsifier, an aqueous dispersion containing high molecular modified blocked tri-isocyanate is obtained.

As emulsifiers, there are included, for example, sodium polyethylenetridecylsulfate, Aerosol OT (brand name), sodium alginate, polyoxyethyleneoctylphenol, sodium laurysulfate and sodium dodecylbenzenesulfonate.

When the aqueous dispersion contains too little solid portion, its adhesive force is insufficient, while too much solid portion contained therein makes the handling of it troublesome. The most preferable amount of solid portion in the dispersion is usually in the range of from 0.5% to 30%.

Another practical embodiment of the composition of this invention is the one comprising an aqueous dispersion which contains a compound produced by the reaction of high molecular modified poly-isocyanate compound and an isocyanate blocking agent, the former being obtained by the reaction of aromatic poly-isocyanate having in its molecule three or more isocyanate groups and di-functional polyester or polyalkylene glycol.

As the aromatic poly-isocyanate, having in its molecule three or more of isocyanate groups, there may be included, for example (a) triphenyl methane tri-isoyanate, 2,4,4'-diphenylether tri-isocyanate, biuret polyisocyanate represented by the general formula

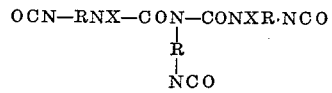

(wherein R stands for an aromatic group such as —C$_6$H$_4$—, —(CH$_3$)C$_6$H$_3$— or —C$_6$H$_4$CH$_2$C$_6$H$_4$— and X stands for hydrogen or a radical represented by —CONHRNCO), trimer of TDI or polymethylene polyphenyl isocyanate (PAPI), or (b) aromatic poly-isocyanate which is obtained by an allowing aromatic di-isocyanate, such as phenylene di-isocyanate, tolylene di-isocyanate (TDI), di-phenyl methane di-isocyanate (MDI), naphthylene di-isocyanate, dianisidine di-isocyanate or bitolylene di-isocyanate to react with a compound having in its molecule three or more hydroxyl groups such as tri-methylol propane, tri-methylol ethane, glycerine, hexane triol, pentaerythritol, castor oil, monoglycerides of oxy carboxylic acid, sorbitol, sorbitan, mannitan, methyl glycosides or ethyl glycoside, at such a condition as NCO/OH>1 (mole) by such a conventional method as is known from, for example, DBP 953012 or DBP 870400.

Among them, aromatic poly-isocyanate shown as (b) or PAPI is rather preferable. An aromatic poly-isocyanate obtained by the reaction of trimethylol propane, glycerine or hexanetriol with TDI or MDI at such a condition as NCO/OH>1 (mole), or PAPI is especially preferable.

These aromatic poly-isocyanates are subjected to the reaction with di-functional polyester obtained by the condensation reaction of one or more glycols, such as ethylene glycol, di-ethylene glycol, tri-ethylene glycol, propylene glycol, di-propylene glycol or butylene glycol, with one or more di-carboxylic acids such as adipic acid, maleic acid, phthalic acid, isophthalic acid, glutaric acid, pimelic acid, sebacic acid, isosebacic acid, terephthalic acid, succinic acid, itaconic acid or dimeric acid, or their acid anhydrides.

The condensation reaction may be carried out in a per se known manner, such as heating the reactants while removing water in the presence of an esterification catalyst, such as mineral acid or ion-exchange resins, more detail of the conditions being described, for example, in "Polyesters and Their Application," third printing, April 1959, published by Bjorksten Research Lab. Inc., New York, U.S.A.

The thus obtained di-functional polyester has two terminal functional groups in the molecule which are both hydroxyl groups or carboxylic groups or both, and in this invention polyester having any of such two terminal functional groups may be employed. As di-functional polyesters, those obtained by the reaction of one or more glycols selected from the group consisting of ethylene glycol, propylene glycol and di-ethylene glycol with one or more di-carboxylic acids selected from the group consisting of adipic acid, phthalic acid, isophthalic acid, maleic acid, terephthalic acid and sebacic acid, or their acid anhydrides are especially preferable.

The afore-explained di-functional polyester provides, when its molecular weight is too small, a weak adhesive force to an adhesive agent which is prepared by the use of a polyester, while, when its molecular weight is too large, a low dynamic adhesion. Otherwise stated, fibrous materials treated with an adhesive agent prepared by the use of such polyester having too large molecular weight are apt to lose their flexibility. Usually, such di-functional polyester having a molecular weight ranging from 1000 to 4000 is employed, and especially those having 1000–2000 molecular weight are preferable.

Aromatic polyisocyanate having three or more NCO groups in the molecule is allowed to react with di-functional polyester at such a rate that the total number of NCO groups in said polyisocyanate relative to the total numbers of active hydrogens in said di-functional polyester is not less than $n$ ($n$ is the numbers of NCO groups in the molecule of the aromatic polyisocyanate). Thus, for example, the rate is three times or more when aromatic tri-isocyanate is employed, while four times or more when aromatic tetraisocyanate is employed.

This reaction readily proceeds in the presence or absence of a solvent having no active hydrogen, e.g., ketones such as acetone or methyl ethyl ketone, esters such as ethyl acetate or butyl acetate, aromatic hydrocarbons such as benzene, toluene or xylene at a room temperature or by heating up to about 40° C. to about 120° C. In this case, there may be used a catalyst such as afore-mentioned tin compounds and amine compounds. Thus, high molecular modified polyisocyanate compounds having three or more terminal NCO groups are obtained as the result of addition reaction which occurred between terminal functional groups of di-functional polyester or polyalkylene glycol and NCO groups of aromatic polyisocyanate. Then the high molecular modified polyisocyanate is allowed to react with an isocyanate blocking agent.

The reaction conditions and the kinds of a blocking agent in this case are the same as mentioned above, namely, those employed in the reaction of tri-functional polyester. Thus, as the result of addition reaction which occurred between blocking agent and three or more terminal NCO groups in high molecular modified polyisocyanate, a compound having blocked isocyanate groups, i.e. high molecular modified blocked polyisocyanate is obtained.

By dispersing into water so obtained compound, with or without the aid of suitable emulsifiers, such as aforementioned, an aqueous dispersion containing high molecular modified blocked polyisocyanate is obtained. When the aqueous dispersion contains too little solid portion, its adhesive force is insufficient, while too much solid portion contained therein makes the handling of it troublesome. The preferred content of solid portion in the dispersion is from 0.5% to 30%.

For adhering fibrous materials, especially polyester fibrous materials, to rubber by using said adhesive composition, there may be used, for example, a variety of methods, such as (1) fibrous materials are treated with an aqueous dispersion containing high molecular modified blocked tri- or poly-isocyanate and after being subjected to heat-treatment (baking), the materials are further treated with an aqueous dispersion containing rubber latex and resorcinol-formaldehyde condensate, then coated on rubber materials after being heat-treated (baked) again, followed by vulcanization under pressure, (2) fibrous materials treated beforehand with an aqueous dispersion containing said high molecular modified blocked tri- or poly-isocyanate are treated with an aqueous dispersion containing rubber latex and resorcinol-formaldehyde condensate, then the so treated materials are baked and coated on rubber materials, followed by vulcanization under pressure, (3) after fibrous materials are treated with a mixture of an aqueous dispersion containing said high molecular modified blocked tri- or poly-isocyanate and an aqueous dispersion containing rubber latex and baked, then, or after further treatment with an aqueous dispersion containing rubber latex and resorcinol-formaldehyde condensate and baking, the materials are coated on rubber materials, followed by being vulcanized under pressure, or (4) after being treated with the mixture dispersion mentioned in (3) and baked, fibrous materials are coated on rubber materials, followed by being vulcanized under pressure. As a concrete process for treating fibrous materials with an aqueous dispersion, there may be employed such a method as dipping the materials into the aqueous dispersion, or applying the dispersion to the materials by a proper means. A temperature of the heat-treatment (baking) is usually maintained between 100° C. and 250° C., and about 1 to about 10% of pick-up of adhesives on fibrous materials is desirable. Rubber latex mentioned in this invention is meant to include natural rubber latex, styrene butadiene rubber latex (referred to as SBR latex), VP latex, butyl rubber latex, chloroprene latex, acrylonitrile-butadiene rubber latex (referred to as NBR latex) and the like. Among them, VP latex is especially preferable. These latexes containing about 30–60% solids are preferably employed. As resorcinol-formaldehyde-condensate, any of the known primary condensate prepared by condensation of resorcinol and formaldehyde by the aid of alkali catalyst may be employed. This resorcinol-formaldehyde-condensate is made into an aqueous dispersion containing about 3–20% solid portions, and by mixing the aqueous dispersion with the afore-mentioned rubber latex, an aqueous dispersion containing rubber latex and resorcinol-formaldehyde-condensate is obtained. As to the solids in this dispersion, the ratio of resorcinol-formaldehyde condensate to rubber latex will range from about 5 to about 50%, preferably from about 15 to about 30%.

When an aqueous dispersion mixture is prepared by mixing an aqueous dispersion containing high molecular modified blocked tri- or poly-isocyanate with an aqueous rubber latex dispersion, the ratio of rubber latex solids to the total solids will range from about 20 to about 60%.

In case an equeous dispersion containing high molecular modified blocked tri- or polyisocyanate and an aqueous dispersion containing rubber latex and resorcinol-formaldehyde are made into an aqueous mixture dispersion, the ratio of high molecular modified blocked tri- or poly-isocyanate solids to the total solids will range from about 10 to about 75% or preferably from about 30 to about 70%.

The present composition for adhesive agent is suitable for adhering fibrous materials, more specifically, polyester fibrous materials to rubbers.

"Fibrous materials" as used herein include fiber, cord, thread, woven cloth, non-woven cloth, sheet, felt, mat, board, and the like. "Rubber materials" include any kind or form of natural and synthetic rubbers.

As explained above, the present composition for adhesive agent is in the form of an aqueous dispersion, requiring no use of organic solvents which are dangerous and expensive, and does not form a gel during storage or in the course of preparation since the NCO groups are blocked.

Furthermore, the composition of the present invention shows outstanding adhesion between fibrous materials and rubbers as compared with the adhesive agent prepared by the use of known blocked isocyanate. Especially, fibrous materials treated with the present composition lose no flexibility nor become rigid by heat-treatment, and withstand a long period of use. Therefore, fibrous materials adherer to rubber materials which are obtained by the use of the present composition has strong flexibility, that is, has high dynamic adhesion, and withstands a long period of use without separation of fibrous materials from rubber materials. In this specification, percentages are based on weight.

The following examples, in which all parts are expressed by weight, will serve to illustrate this invention in more detail.

EXAMPLE 1

2,4-tolylene di-isocyanate (104 parts) dissolved in toluene (30 parts) is heated in a reaction vessel up to 100°–110° C. To the solution is slowly added dropwise polyester (100 parts) having an OH value of 320 and an acid value of not more than 4, which is prepared by subjecting adipic acid (88 parts), ethylene glycol (36 parts) and trimethylol propane (13 parts) to condensation reaction, then the resulting reaction product is kept for about 90 minutes. To the so obtained reaction solution is further added m-cresol (33 parts), and the mixture is heated for about six hours at about the same temperature as above, whereupon prepolymer adduct (high molecular blocked tri-isocyanate), most of its terminals being toluyl-urethane, is obtained. The prepolymer adduct (100 parts) is emulsified with an aqueous solution consisting of water (400 parts), polyoxyethylene octyl phenol (1 part) and sodium bi-phosphate (1 part). From the emulsion, water and solvents used are partly eliminated so that the solid portion in the emulsion may be 20%. RFL solution is prepared in the following manner: solution A is prepared by mixing resorcinol (12.5 parts), formalin (37%) (18.4 parts), caustic soda (2.5 parts) and water (271 parts), and then leaving the mixture for about 4 hours at a room temperature. Solution B: vinyl pyridine co-polymer latex (copolymer of butadiene (70 parts), styrene (15 parts) and vinylpyridine (15 parts); total solid portion (40%) 295 parts). Solution A is slowly mixed with solution B to prepare RFL solution.

Into the aqueous adhesive agent prepared by mixing prepolymer adduct emulsion and RFL solution at various ratios, polyethylene terephthalate tire cord is dipped and baked for 15 minutes at 180° C. Then, the so treated polyethylene terephthalate tire cord is incorporated into rubber stocks consisting of 100 parts natural rubber, 37.5 parts carbon black, 1 part stearic acid, 5 parts zinc oxide, 3 parts pine tar, 3 parts sulfur, 1 part Antigene D and 1 part Soxinol DM, and is cured with pressure in a mould for preparing samples for H-test. With the sample, the force required in pulling out the cord from the cured rubber is measured and the result is shown in Table 1.

TABLE 1

| Prepolymer adduct emulsion/RFL solution | 1:4 | 1:3 | 1:2 | 1:1 | 2:1 |
|---|---|---|---|---|---|
| Pickup of adhesive agent (percent) | 7.5 | 7.4 | 6.8 | 8.1 | 7.1 |
| Adhesion (kilogram) | 7.68 | 8.45 | 8.92 | 7.56 | 6.53 |

EXAMPLE 2

Diphenylmethane-4,4'-diisocyanate (232 parts) and dimethyl formamide (100 parts) are heated to 90 C. in a reaction vessel. To the reaction mixture is added portionwise polyester (100 parts) having the same properties as in Example 1. After addition of the total volume of polyester, the mixture is subjected to reaction for about one hour.

To the reaction mixture are added ethyl acetoacetate (180 parts) and, as a catalyzer, a small amount of metallic sodium, then said reaction mixture is allowed to further react with the ethyl acetoacetate at a temperature of 100°–110° C. for about 8 hours, followed by removing most of the solvents used, under reduced pressure to give a viscous prepolymer adduct. In a similar manner as in Example 1, the propolymer adduct is made into an emulsion containing solid portion in about 20% of the whole volume of the dispersion.

RFL solution is prepared in a similar manner as in Example 1.

Polyethylene terephthalate tire cord is dipped into an aqueous adhesive agent prepared by mixing the aforementioned emulsion of prepolymer adduct with RFL solution, and baked for 15 minutes at 160° C. The cord is then incorporated into rubber stocks having the same consistency as in Example 1 and vulcanized under pressure. The forces required to pull out the cord from the stocks and the dynamic adhesion of the cord are determined. The dynamic adhesion test is carried out by curing a rubber block around the treated cord at its center. The cord is stretched and fastened at both ends, while the rubber block was vibrated a distance of 0.125 inch along the path of the cord until complete separation of the rubber from the cord occurs. The time required for the separation is measured.

TABLE 2

| Prepolymer adduct emulsion/RFL solution | 1:3 | 1:2 |
|---|---|---|
| Adhesion (kilograms) | 8.71 | 9.41 |
| Dynamic adhesion (minutes) | 95 | 120+ |

EXAMPLE 3

Hexamethylene di-isocyanate (48 parts) dissolved in toluene (20 parts) is heated in a reaction vessel to 100-110° C. To the mixture is slowly added, dropwise, polyester (100 parts), its molecular weight being about 1000, which is prepared by condensing phthalic acid, adipic acid, propylene glycol and trimethylol propane, the resulting reaction product being allowed to stand for about 90 minutes. To the reaction solution, xylenolic acid (41 parts) is added, and the mixture is heated for about 6 hours at the same temperature as above. Then, the resulting reaction product is emulsified in the same manner as Example 1, so as to contain 20% solids based on the total weight. To the thus obtained emulsion (100 parts), SBR latex (copolymer latex consisting of styrene (23%) and butadiene (77%)) (30 parts), having a 40% solid portion based on the total weight, is added and mixed.

Into this mixture solution, polyethylene terephthalate tire cord is dipped, then heated at 180° C. for 10 minutes. The treated cord is further dipped into RFL solution prepared in a similar manner as Example 1, then heated for 10 minutes at 150° C. and incorporated into rubber stocks having the same consistency as in Example 1, followed by vulcanization under pressure. The adhesion is about 8.56 kilograms.

EXAMPLE 4

Dianisidine diisocyanate (100 parts) dissolved in ethyl acetate (40 parts) is heated to 70–80° C. To the solution is slowly added, dropwise, polyester (100 parts), its molecular weight being about 1200, prepared by condensing adipic acid, propylene glycol and hexanetriol, the resulting reaction product being allowed to stand for about 90 minutes. To the reaction solution is added, dropwise, methylethyl ketone oxime (27.5 parts) and allowed to stand overnight. The result of quantitative analysis shows isocyanato radical completely blocked. The resulting prepolymer adduct (100 parts) is emulsified in the same manner as in Example 1 to obtain an emulsion containing 20% solids. The emulsion is mixed with SBR latex mentioned in Example 3 at a ratio of 3:1. Into the mixture solution, polyethylene terephthalate tire cord is dipped, then heated at 180° C. for 10 minutes. The treated cord is further dipped in the RFL solution mentioned in Example 1, then heated at 150° C. for 10 minutes and incorporated into rubber stocks having the same consistency as in Example 1, followed vulcanization under pressure. The adhesion is about 9.78 kilograms.

EXAMPLE 5

Hexamethylene diisocyanate (48 parts) dissolved in toluene (20 parts) is heated in a reaction vessel up to 100–110° C. To the solution is slowly added dropwise, polyester triol (100 parts), its molecular weight being about 1000, which is prepared by condensing ethylene oxide using trimethylol propane as an initiator, then the resulting reaction is allowed to stand for about 90 minutes.

To the reaction solution, xylenolic acid (41 parts) is added, and the mixture is heated for about six hours at the same temperature as above.

The resulting reaction product is emulsified in the same manner as Example 1 to obtain an emulsion containing 20% solids. To the emulsion (100 parts), SBR latex (30 parts) mentioned in Example 3 is added and mixed. To the mixture solution, polyethylene terephthalate tire cord is dipped, then heated at 180° C. for 10 minutes and incorporated into rubber stocks having the same consistency as in Example 1, followed by vulcanization under pressure. The adhesion is about 8.02 kilograms.

EXAMPLE 6

75% ethyl acetate solution of the adduct (109 parts) prepared by the reaction of trimethylol propane with surplus tolylene diisocyanate is heated in a reaction vessel, to 70–80° C. To the reaction solution is slowly added, dropwise, a solution obtained by dissolving in toluene (135 parts) linear polyester (80 parts) having an OH value of 40 and an acid value of 3, prepared by condensing diethylene glycol, isophthalic acid and maleic acid. After being heated for about two hours, the amine equivalent is 1050, which shows that most of the polyester is subjected to the reaction with isocyanate.

To the so obtained reaction solution is further added m-cresol (35 parts) and a small amount of triethylamine and the mixture is heated to 90–100° C. for about six hours, whereupon isocyanato radical is blocked. The thus obtained m-cresol adduct (100 parts) is emulsified with an aqueous solution (400 parts) consisting of sodium polyoxyethylene tridecylsulfate (5 parts) and polyoxyethylene octyl phenol (1 part). The emulsion prepared as above is named emulsion A. Emulsion B (RFL) is prepared in the following manner: Solution A is prepared by mixing resorcinol (12.5 parts), formalin (37%) (18.4 parts), caustic soda (2.5 parts) and water (271 parts), and allowing the mixture to remain for about 4 hours at a room temperature. Solution B is vinyl pyridine copolymer latex (295 parts, the same as in Example 1). Solution A is slowly mixed with solution B to prepare RFL solution.

Polyethylene terephthalate tire cord is dipped in Emulsion A and baked at 180° C., then the cord is dipped in RFL solution and baked at the same temperature. Pickup of adhesive agent of Emulsion A and Emulsion B reaches a total of 8.21%.

The so treated polyethylene terephthalate tire cord is incorporated into rubber stocks of the same consistency as in Example 1, followed by vulcanization under pressure in a mould for preparing samples for H-test. With the sample, the adhesion, that is the force required for pulling out the cord is measured.

Fatigue resistance to flexing is determined with the Scott-type tester, using the specimen prepared by imbedding the polyethylene terephthalate tire core treated as above into the rubber stocks as Example 1.

The cycles required for separation of the polyethylene terephthalate tire cord from the rubber stocks are measured.

Adhesion, kilograms _____ 12.5
Fatigue resistance to flexing, cycles _____ 93,200

EXAMPLE 7

In the same manner as Example 6, 75% ethyl acetate solution of the adduct (12.3 parts) prepared by the reaction of trimethylol propane with tolylene di-isocyanate and polypropylene glycol (70 parts), (average molecular weight at 2000, OH value about 56) are heated in a reaction vessel to 70–80° C. for about six hours under agitation. To the reaction solution is added xylenolic acid (37 parts) and a small amount of triethylamine, then the mixture is further subjected to the reaction at 90–100° C. for about six hours to block isocyanato radical. The resulting reaction product is emulsified in the same manner as Example 6. Polyethylene terephthalate tire cord is dipped in said emulsion and baked at 180° C., then the cord is dipped in the same RFL solution as mentioned in Example 6 and baked.

Adhesion and fatigue resistance to flexing are determined in the same manner as Example 6 and the following results obtained.

Adhesion, kilograms _____ 10.7
Fatigue resistance to flexing, cycles _____ 85,000

EXAMPLE 8

To polymethylene polyphenyl isocyanate (80 parts) (PAPI), heated in a reaction vessel to 60–70° C., is added, dropwise, polyester (100 parts) having an OH value of 40, an acid value of 3 and a molecular weight of about 2100, which is prepared by condensing adipic acid and diethylene glycol, and allowing the resulting reaction to stand for about 1.5 hours at the same temperature. To the reaction solution is added diethyl malonate (90 parts) and a small amount of sodium methoxide, then the mixture is heated for about three hours at about 70° C. to block isocyanato radical. The resulting reaction product is emulsified in the same manner as Example 6 to make an emulsion containing 20% solids.

Polyethylene terephthalate tire cord is dipped in an adhesion solution prepared by mixing the emulsion (35 parts) with RFL (65 parts) mentioned in Example 6 and heated for 25 minutes at 220° C. Pickup of adhesives is 7.6%.

The thus treated cord is incorporated into rubber stocks of the same consistency as in Example 1, followed by vulcanization in a mould for preparing samples for H-test. The adhesion is 12.8 kilograms.

EXAMPLE 9

To polymethylene polyphenyl isocyanate (93 parts) (PAPI), heated in a reaction vessel up to 60–70° C., is slowly added, dropwise, polyester (100 parts) dissolved in ethyl acetate, which is prepared by condensing propylene glycol, isophthalic acid and maleic acid anhydride, and allowing the resulting reaction to stand for about two hours. To the reaction solution is added t-amyl alcohol (58 parts) and a small amount of triethylamine, then the mixture is heated for about five hours at 90–160° C. to block isocyanato radical, and the resulting reaction product is emulsified to produce an emulsion containing 20% solids. Polyethylene terephthalate tire cord is dipped in a mixture of the emulsion (100 parts) and vinylpyridine copolymer latex (21.5 parts) (the same one with that in Example 1: 40% on solids), then is further dipped in RFL mentioned in Example 6 and baked for three minutes at 200° C.

Adhesion and fatigue resistance to flexing are determined in the same manner as Example 1 to obtain the following result.

Adhesion, kilograms _____ 12.8
Fatigue resistance to flexing, cycles _____ 112,000

EXAMPLE 10

Hydroxypolyester (100 parts) having an OH value of 30 and an acid value of less than 1, which is prepared by condensing triphenylmethane triisocyanate (80.9 parts), ethylene glycol, terephthalic acid, isophthalic acid and sebacic acid is dissolved in ethylene chloride and heated to 60–70° C. for 1.5 hours in a dry nitrogen gas current. To the cooled reaction solution is slowly added methylethyl ketone oxime (55.7 parts), and the resulting reaction product is allowed to stand for two hours to block isocyanato radical.

The resulting reaction product is made into an aqueous emulsion containing 20% solids in the same manner as Example 6. Polyethylene terephthalate tire cord is dipped in an adhesion solution prepared by mixing the dispersion (30 parts) and RFL (70 parts) mentioned in Example 6 and treated under heating for 2.5 minutes at 220° C. Pickup of adhesives is 7.5%. The treated cord is tested in the same manner as Example 6 to obtain the following result.

Adhesion, kilograms _____ 13.2
Fatigue resistance to flexing, cycles _____ 101,000

EXAMPLE 11

To 75% acetic acid solution of adduct (290 parts), prepared by the reaction of trimethylol propane with excess dianisidine di-isocyanate, is slowly added, dropwise, polyester (94 parts) having an OH value of 56 and an acid value of 4 dissolved in toluene (120 parts), which is prepared by condensing adipic acid and ethylene glycol, and then allowed to stand for two hours. To the reaction solution is added phenol (50 parts) and a small amount of triethylamine, and the mixture is heated up to 90–100° C. for about six hours to block isocyanato radical. The reaction mixture is emulsified in the same manner as Example 6 to produce an emulsion containing 20% solids.

To the emulsion (100 parts) is added and mixed in the same manner as Example 1 vinylpyridine copolymer latex (50 parts) (40% on solids). Polyethylene terephthalate tire cord is dipped in the mixture solution and heated for five minutes at 150° C. Then the cord is dipped in RFL solution mentioned in Example 7 and heated for five minutes at 150° C. Pickup of adhesives is 6.75%. The treated cord is tested in the same manner as Example 6.

Adhesion, kilograms _____ 12.4
Fatigue resistance to flexing, cycles _____ 87,000

EXAMPLE 12

Adduct (128 parts) prepared by the reaction of trimethylol propane with excess hexamethylene di-isocyanate is treated in the same manner as Example 11 with polyester (94 parts) mentioned in Example 11 and methylethyl ketone oxime (46 parts) to obtain an emulsion containing 20% solids. The emulsion is mixed with vinylpyridine copolymer latex mentioned in Example 1 at the rate of 2:1. Polyethylene terephthalate tire cord is treated in the same manner as Example 11 with the mixture and RFL solution mentioned in Example 6. Pickup of adhesive: 7.05%.

Adhesion, kilograms _____ 10.7
Fatigue resistance to flexing, cycles _____ 105,000

Reference 1

Employing a publicly known adhesive composition [1] instead of the adhesive agent used in Example 2, polyethylene terephthalate tire cord is treated and tested in the same manner as Example 2.

The result is as follows:

Adhesion, kilograms _____ 5.20
Dynamic adhesion, minutes _____ 62

Reference 2

Employing publicly known adhesive composition prepared by emulsifying methylene-bis-4,4'-diphenylurethane (100 parts) with an aqueous solution (400 parts) consisting of sodium polyethylene dodecylsulfate (5 parts) and polyoxyethylene octyl phenol (1 part) instead of emulsion A used in Example 6, polyethylene terephthalate tire cord is treated and tested in the same manner as Example 6. The result is as follows:

Adhesion, kilograms _____ 6.5
Fatigue resistance to flexing, cycles _____ 72,500

The polyethylene terephthalate tire cord used in these examples and references is sold by Teijin Limited, and is known as Tetron tire cord.

What is claimed is:

1. An adhesive composition which comprises an aqueous dispersion containing a mixture of a conjugated diene-type rubber latex, an alkyl catalyzed condensation product of resorcinol and formalin, and the reaction product of an isocyanate blocking agent selected from the group consisting of phenols, active methylene compounds and oximes with polymeric modified tri-isocyanate, the said tri-isocyanate being the reaction product of aromatic di-isocyanate with a polymer, the ratio of the total number of NCO groups in the molar quantity of said aromatic di-isocyanate employed and the total number of active hydrogens in said polymer per mol thereof being not less than 2, said polymer being trifunctional polyester having a molecular weight of about 1000–4000, and being the condensation product of glycol, low molecular triol and a member selected from the group consisting of dicarboxylic acid and its anhydride, the isocyanate groups of the said reaction product of the blocking agent and the polymerically modified tri-isocyanate being completely blocked.

2. An adhesive composition which comprises an aqueous dispersion containing a mixture of a conjugated diene-type rubber latex system, an alkali catalyzed condensation product of resorcinol and formalin, and the reaction product of an isocyanate blocking agent selected from the group consisting of phenols, active methylene compounds and oximes with polymeric modified polyisocyanate, said polyisocyanate being the reaction product of aromatic polyisocyanate having not less than three isocyanate radicals and a polymer, the ratio of the total number of NCO groups in the molar quantity of the aromatic polyisocyanate employed and the total number of active hydrogens in said polymer per mol thereof being not less than $n$ where $n$ is the number of NCO groups in the molecule of the aromatic polyisocyanate, said polymer being difunctional polyester having a molecular weight of about 1000–4000, and being the condensation product of a glycol and a member selected from the group consisting of

---

[1] The known adhesive agent consists of:

| | Parts |
|---|---|
| Methylene-bis-4,4'-diphenylurethane | 100 |
| Gen-Tac latex (solid portion is 20%) | 280 |
| Dioctyl sodium sulfosuccinate | 8 |
| Na-alginate | 11 |
| Water | 743 | dicarboxylic acid and its anhydride, the isocyanate groups of the said reaction product of the blocking agent and the polymerically modified polyisocyanate groups being completely blocked.

References Cited

UNITED STATES PATENTS

| | | | |
|---|---|---|---|
| 2,723,265 | 11/1955 | Stallmann. | |
| 2,902,388 | 9/1959 | Szukiewicz. | |
| 2,916,403 | 12/1959 | Calderwood. | |
| 2,935,487 | 5/1960 | Fox et al. | |
| 3,062,757 | 11/1962 | Dombrow. | |
| 3,094,495 | 6/1963 | Gemeinhardt. | |
| 3,226,276 | 12/1965 | Rye et al. | 260—29.3 |
| 3,268,467 | 8/1966 | Rye et al. | 260—29.3 |

FOREIGN PATENTS 893,273    4/1962    Great Britain.

OTHER REFERENCES

Low Durometer Cast Urethane Elastomers, H. L. Heiss, Rubber Age, October 1960, pp. 89–97.

Adhering Dacron to Rubber, Thompson et al., Adhesive Age, February 1959, vol. 2, pp. 30–33.

MURRAY TILLMAN, *Primary Examiner.*

J. C. BLEUTGE, *Assistant Examiner.*

U.S. Cl. X.R.

156—331, 334, 335; 161—190; 260—29.2, 75, 77.5, 841, 859